United States Patent

[11] 3,617,121

[72] Inventor Marilyn M. Culp
 P. O. Box 5455, Midland, Tex. 79701
[21] Appl. No. 866,184
[22] Filed Oct. 14, 1969
[45] Patented Nov. 2, 1971

[54] SELECTIVE IMAGE PRODUCING APPARATUS FOR USE WITH A PROJECTOR
4 Claims, 6 Drawing Figs.

[52] U.S. Cl. .................................................. 353/120, 353/110
[51] Int. Cl. .................................................. G03b 21/00, G03b 23/10
[50] Field of Search .......................................... 353/110, 120, 122; 40/63 A, 106.1

[56] References Cited
UNITED STATES PATENTS
2,270,942 1/1942 Fischer ........................ 353/110
2,576,714 11/1951 Cox ............................. 353/110
2,842,882 7/1958 Greene ......................... 40/63 A FOREIGN PATENTS
767,624 2/1957 Great Britain ................ 353/110

Primary Examiner—William D. Martin, Jr.
Assistant Examiner—A. J. Mirabito
Attorney—Marcus L. Bates ABSTRACT: Apparatus for use in combination with a projector for selectively projecting the image of one of a plurality of small transparencies from the projector to an image-receiving surface. The apparatus is in the form of a file folder having spaced-apart light-passing passageways therein, and having a disk rotatably supported by the file folder, with the disk having a plurality of circumferentially disposed windows therein. Rotation of the disk enables any one of the windows to be superimposed upon the aligned light-passing passageways. Each window removably receives and supports a transparency therein by means of inwardly directed tabs.

PATENTED NOV 2 1971 3,617,121
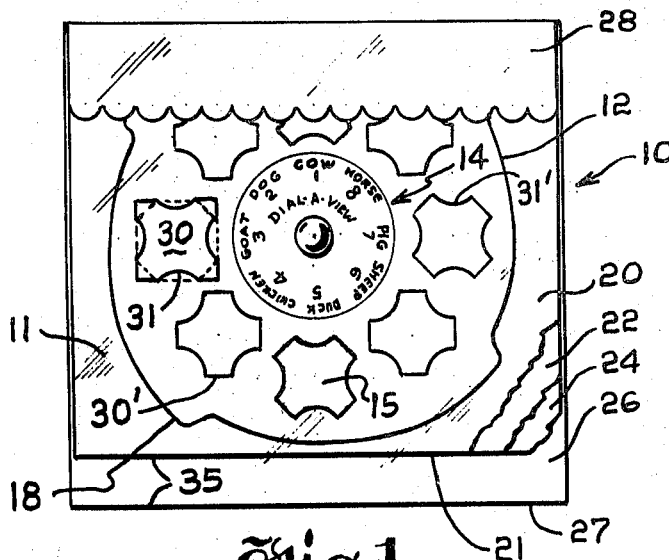
Fig.1
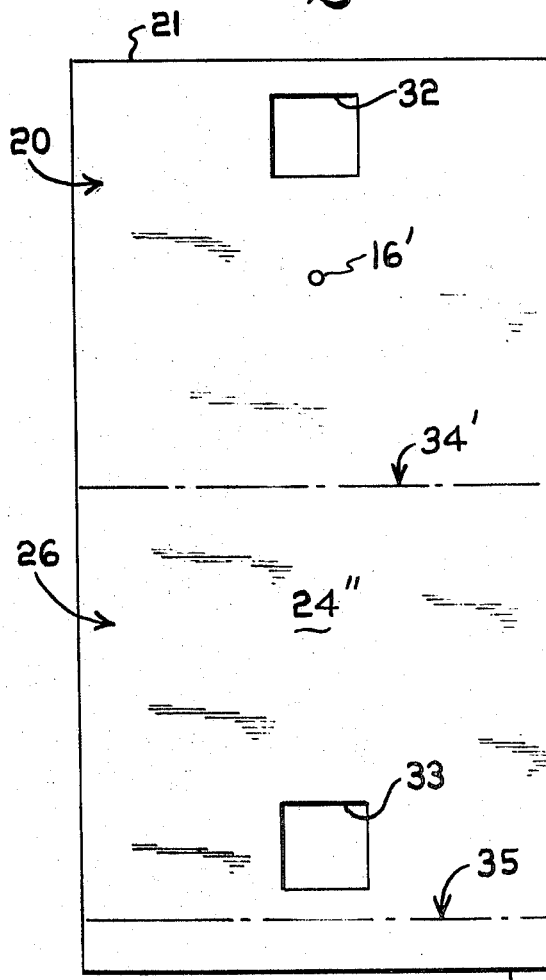
Fig.3
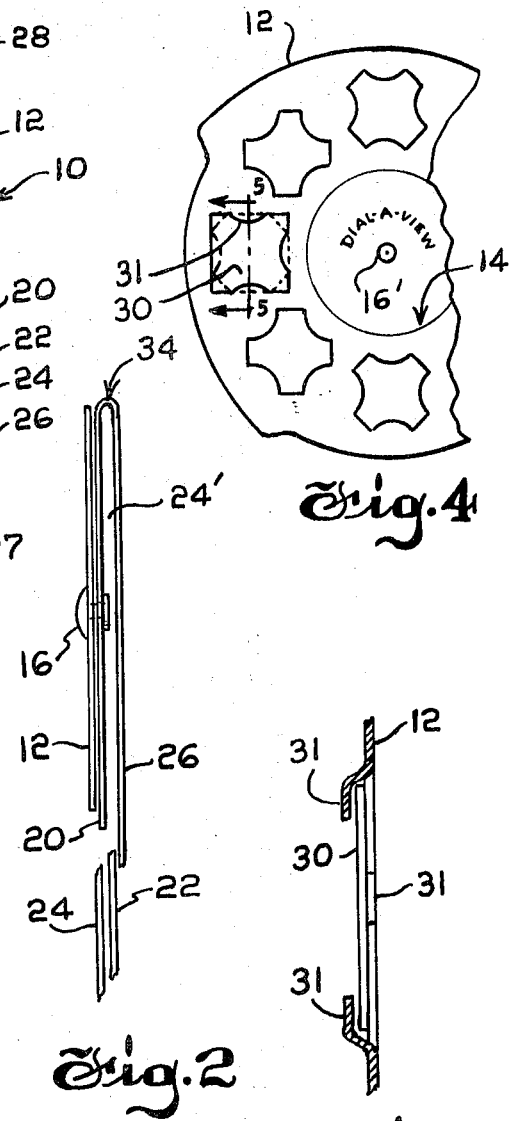
Fig.2
Fig.4
Fig.5
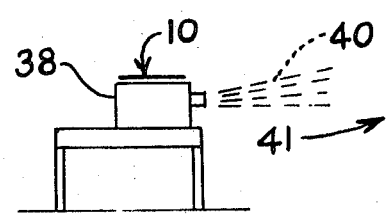
Fig.6
INVENTOR
MARILYN M. CULP
BY MARCUS L. BATES
AGENT

SELECTIVE IMAGE PRODUCING APPARATUS FOR USE WITH A PROJECTOR

BACKGROUND OF THE INVENTION

Transparencies of a type generally used in conjunction with a projector, such as an overhead projector, are valuable teaching aids. The overlays or transparencies of the prior art often include several superimposed transparent sheets having indicia or pictorial representations thereon so as to progressively complicate information as it is presented to the pupils. Transparencies used in conjunction with an overhead projector are expensive and usually are limited in use to several superimposed transparent sheets, and hence the subject matter thereof is necessarily restricted in scope Accordingly, it is desirable to reduce the cost of educational aids of this nature while at the same time substantially increasing the amount of available information which can be provided by the apparatus.

SUMMARY OF THE INVENTION

This invention sets forth inexpensive apparatus for use in conjunction with projectors for the selective projection of images from a film or the like, and includes a sheet of material such as heavy paper or cardboard which is folded back upon itself to provide a file folder having a light-passing passageway therethrough. One of the two adjacent sheets of material rotatably receives a disk, with the disk having means forming a journal with respect to one of the adjacent sheets of the folder. The disk further includes a plurality of windows, each of which is radially spaced equidistant from and circumferentially surrounding the journal. The windows, when rotated into alignment with the passageways, permit light to pass through the film contained in the window and the passageways. Each window has inwardly depending tabs which cooperate with a mounted film or transparency with the tabs being disposed on opposite sides of the film in a manner to enable the film to be replaced when desired.

It is therefore an object of this invention to provide improvements in selective image producing apparatus.

Another object of this invention is to provide apparatus in the form of a file folder which can be used in conjunction with a projector in order to provide a visual teaching aid.

A further object of this invention is the provision of a visual teaching aid apparatus comprised of a multiplicity of films which are mounted upon an inexpensive rotatable disk journaled to a file folder.

A still further object of the present invention is the provision of means which enables one of a multiplicity of transparencies to be selectively placed upon the image-receiving portion of an overhead projector.

These and other objects of the present invention are attained by the provision of a sheet of heavy paper arranged in the form of a file folder which has a light passing passageway formed therein, and a disk rotatably received thereon. The disk has multiple film-containing windows formed therein which are selectively brought into alignment with the passageways as the disk is rotated to thereby project the image contained on the transparency onto the image-receiving portion of the projector.

Other objects will occur to those skilled in the art as the remainder of this disclosure is digested.

BRIEF DESCRIPTION OF THE DRAWINGS

FIG. 1 is a top plan view of the present invention, shown in its packaged form, with some parts thereof being broken away and removed therefrom in order to better disclose the apparatus;

FIG. 2 is a broken side view of some parts of the visual aid device seen in FIG. 1;

FIG. 3 is a top plan view of a portion of the apparatus disclosed in FIGS. 1 and 2;

FIG. 4 is a fragmentary top plan view of part of the apparatus seen in FIGS. 1 and 2;

FIG. 5 is an enlarged fragmentary cross-sectional representation taken along line 5—5 of FIG. 4; and FIG. 6 is a diagrammatical representation of one contemplated use of the present invention.

DETAILED DESCRIPTION OF THE INVENTION

As seen in the various figures of the drawing, a selective image producing apparatus 10 is packaged within a transparent outer covering 11 with a disk 12 being partially exposed to view. The disk includes indicia 14 which is generally related to the subject matter covered by the visual aid apparatus. Where deemed desirable, numeral 14 can also be a reinforcement, such as a smaller disk, which is cemented to the larger disk. Several windows 15 are radially spaced equidistant from each other and from the center of the disk with the center of the disk receiving fastener means 16 therethrough. Finger engaging means in the form of a protruding lug 18 facilitates manipulation of the disk.

The apparatus is comprised of an elongated sheet of self supporting material such a paper, plastic, or plasticlike material defined by upper, lower, and side edge portions, with the upper edge portion being seen at 21.

Numerals 22, 24 indicate instructional material which is conveniently inserted and stored within the fold or space 24' formed between lower sheet 26 and upper adjacent sheet 20. Lower edge portion 27 preferably extends below edge portion 21 when the sheet is folded.

Inner cover 28 is an attractive folded wrapper which extends a limited length along the folded edge portion 34 of the apparatus, and forms no part of the present invention.

A mounted film 30, hereinafter called "transparency," such as an ordinary reinforced film as is used with a slide projector, is inserted in a window 15. The reinforced marginal edge portions of the transparency are maintained in alignment by means of tabs 31. As seen in the drawing, adjacent tabs are spaced apart from one another by an edge portion 30' and the transparency is sandwiched between diametrically opposed tabs in the illustrated manner of FIGS. 1 and 5. It is contemplated that the configuration of the transparency could also take on other and different forms.

The upper and lower adjacent sheets are provided with light passing passageways in the form of apertures 32, 33, respectively. Sheet 20 is folded along fold line 34' and back upon sheet 26 in a manner to leave marginal edge portion 35 extending below edge portion 21, thereby rendering the fold space readily accessible to the instructor.

The invention 10 is used in conjunction with an overhead projector 38 with the image being projected towards a suitable surface 41, as for example, a screen.

OPERATION

The apparatus of the present invention is preferably assembled by folding upper sheet 20 along dash-dot fold line 34' and back upon lower adjacent sheet 26 to form a file folder and to to superimpose light-passing passageway 32 upon light passing-passageway 33, while at the same time leaving marginal edge portion 35 between edge portions 21 and 27. A fastener means 16, such as a hollow rivet for example, forms a journal between the disk and the upper sheet while at the same time maintaining the disk in proper aligned relationship with the folder and the light-passing passageways. With the disk rotatably mounted or journaled to the folder in the illustrated manner of FIGS. 1 and 2, it will be seen that each window can be rotated or moved in a circular direction by merely engaging one's finger with one of the protruding lugs 18 so as to selectively position any desired window in aligned relationship with respect to the two superimposed light passageways.

Where deemed desirable, indicia at 14 can be correlated with the subject matter of each window so as to cause the subject matter appearing in the light passageways to correspond with the uppermost indicia. For example, "cow 1" as seen in FIG. 1, would relate to some aspect of a cow (not shown) in the window at 15.

The transparencies 30 are preferably a readily available slide type mounted film such as associated with an ordinary slide projector. This type film is well known to those skilled in the art. The reinforced marginal edge portions of the mounted film are sandwiched between diametrical opposed tabs in a manner as best seen in FIG. 5. This expedient leaves the film portion of the transparency freely suspended in an unobstructed manner in the window and properly aligned with the superimposed light passageways.

In using the present invention in conjunction with an ordinary overhead projector, such as illustrated in FIG. 6, it will of course be necessary to readjust the distance from screen 41 to the projector 38 as well as to refocus the projector for the reason that the amount of light now available at 40 is much less than would be available using an ordinary transparency due to the difference in the size of the transparencies. Nevertheless, it has been found that adequate light at 40 is produced when using the present invention. Moreover, it is contemplated to use larger windows and transparencies for some applications of the combination.

It is deemed both convenient and desirable to insert instructional material 22, 24 into the folder at 24' so as to enable the entire lesson associated with the subject matter of the transparencies to be filed away in an ordinary file cabinet where it is readily available to any instructor.

While it is not essential to the operation or understanding of the present invention, it is further desirable to package the present invention by the provision of an inner cover 28 which imparts an attractive appearance to the apparatus, after which the entire apparatus is encased within a transparent outer covering 11, such as a polyethylene bag.

I claim:
1. In combination with an overhead projector which projects an image from a transparency or the like to an image-receiving surface spaced apart from the transparency; the improvement comprising:
   a selective image producing apparatus;
   said apparatus including a sheet of material bounded by an edge portion which defines spaced-apart ends and spaced-apart sides;
   means forming light passageways in said sheet, said sheet being folded along an imaginary line located intermediate said passageways to enable one of said passageways to be superimposed upon another of said passageways, and to effectively form two adjacent sheets of material which are joined together along an edge portion thereof; wherein, said two adjacent sheets of material form a file folder for holding instructional material therein;
   a disk having means forming a journal thereon, means forming a plurality of windows in said disk with each of said windows being spaced equidistant from and circumferentially surrounding said journal; said windows including means for holding transparencies therein;
   said means forming a window includes a cutout which is defined by diametrically opposed tabs and diametrically opposed edge portions with each said tab being spaced apart from an adjacent tab by an edge portion to thereby enable a transparency to be held in said window in sandwiched relationship between pairs of opposed tabs;
   said journal being attached to one of said adjacent sheets of material at a position to enable each of said windows to be selectively aligned with said spaced apart passageways as said disk is rotated about said journal; whereby:
   a transparency held in a window by said means for holding said transparency can be rotated into alignment with said passageways by rotating said disk about said journal, whereupon the image from the transparency can be projected by the referred to overhead projector.

2. The improvement of claim 1 and further including means by which said disk is attached to an outer side of one of said two adjacent sheets of material forming a file folder.

3. The improvement of claim 1 wherein said journal includes a fastener means;
   means forming a pivotal point in the form of an aperture through said disk and through one of said adjacent sheets, said fastener means being received through the last two recited apertures and rotatably fastening said disk to said one of said adjacent sheets.

4. The improvement of claim 1 wherein said journal also includes a fastener means;
   means forming a pivotal point in the form of an aperture extending through said disk and through one of said adjacent sheets, said fastener means being received through the last two recited apertures, and said journal means adapted to rotatably fasten said disk to said one of said adjacent sheets.

* * * * *